UNITED STATES PATENT OFFICE.

ARMAND STIEGELMANN AND ERICH DEHNEL, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

BLEACHING COMPOSITION.

984,312.  Specification of Letters Patent.  Patented Feb. 14, 1911.

No Drawing.  Application filed November 10, 1909.  Serial No. 527,316.

*To all whom it may concern:*

Be it known that we, ARMAND STIEGELMANN and ERICH DEHNEL, doctors of philosophy and chemists, subjects of the German Emperor, residing at Ludwigshafen-on-the-Rhine, Germany, have invented new and useful Improvements in a Bleaching Composition, of which the following is a specification.

We have discovered a new composition of matter which consists of solid anhydrous sodium hydrosulfite and zinc dust, and which can be used as a bleaching agent. The solid anhydrous sodium hydrosulfite can be obtained, for example, according to the process claimed in Patent No. 795,755 and in the pure state possesses a composition corresponding to the formula $Na_2S_2O_4$. Our new bleaching agent is as stable in the form of powder as the solid anhydrous sodium hydrosulfite itself and possesses advantages over this body in some of its applications. In particular, the solutions obtained by mixing the new agent with water are more stable than are sodium hydrosulfite solutions free from zinc dust, and further they have a greater bleaching action in some cases. The new mixture is preferable to anhydrous sodium hydrosulfite itself for bleaching purposes in cases where the bleaching action has to be prolonged, for the greater stability of the solutions makes their use more economical than that of sodium hydrosulfite itself, the solutions of which rapidly deteriorate in activity. Thus the new agent is especially useful for bleaching leather, glue, and feathers and the cheaper varieties of straw.

As an example of the composition of the new bleaching agent we instance (without limiting ourselves thereto) a mixture of one hundred parts by weight of commercial solid anhydrous sodium hydrosulfite (containing, say, about ninety per cent. of pure anhydrous sodium hydrosulfite $Na_2S_2O_4$) and ten parts by weight of zinc dust. These are thoroughly mixed together.

Now what we claim is:—

1. The new bleaching composition consisting of solid anhydrous sodium hydrosulfite and zinc dust.

2. The new bleaching composition consisting of one hundred parts of solid anhydrous sodium hydrosulfite and ten parts of zinc dust.

In testimony whereof we have hereunto set our hands in the presence of two subscribing witnesses.

ARMAND STIEGELMANN.
ERICH DEHNEL.

Witnesses:
J. ALEC. LLOYD,
W. W. SCHMIDT.